(12) United States Patent
Suzuki

(10) Patent No.: US 8,151,917 B2
(45) Date of Patent: Apr. 10, 2012

(54) COOLING SYSTEM, CONTROL METHOD OF COOLING SYSTEM, AND VEHICLE EQUIPPED WITH COOLING SYSTEM

(75) Inventor: Takashi Suzuki, Gotenba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1048 days.

(21) Appl. No.: 11/992,747

(22) PCT Filed: Oct. 20, 2006

(86) PCT No.: PCT/JP2006/320938
§ 371 (c)(1),
(2), (4) Date: Mar. 28, 2008

(87) PCT Pub. No.: WO2007/049516
PCT Pub. Date: May 3, 2007

(65) Prior Publication Data
US 2009/0139686 A1      Jun. 4, 2009

(30) Foreign Application Priority Data

Oct. 25, 2005    (JP) .................................. 2005-309556

(51) Int. Cl.
*B60W 20/00* (2006.01)
(52) U.S. Cl. ..................................... 180/65.275; 165/42
(58) Field of Classification Search ............. 180/65.275, 180/68.1, 68.2, 68.3, 68.4; 165/42, 51, 287, 165/294, 296, 297, 300
See application file for complete search history.

(56) References Cited

U.S. PATENT DOCUMENTS 5,724,924 A * 3/1998 Michels ..................... 123/41.12
(Continued)

FOREIGN PATENT DOCUMENTS

JP          A-10-238345          9/1998
(Continued)

OTHER PUBLICATIONS

Extended European Search Report issued in European Patent Application No. EP 06 82 1999.7 dated Apr. 8, 2011.

*Primary Examiner* — J. Allen Shriver, II
*Assistant Examiner* — Brodie Follman
(74) *Attorney, Agent, or Firm* — Oliff & Berridge, PLC

(57) ABSTRACT

A cooling system is equipped with a circulation flow path arranged to flow a coolant into an engine, a motor drive system flow path branched off from the circulation flow path and arranged to flow the coolant into a motor drive system, a flow rate distribution regulator provided at a junction of the circulation flow path and the motor drive system flow path, and an electric pump configured to pressure-feed the coolant through the circulation flow path. In the cooling system, the procedure of flow rate control sets an engine flow rate demand Vwe based on a rotation speed Ne and a torque te of the engine and a coolant temperature Te (step S110), while setting a motor flow rate demand Vwm based on an inverter current Iinv of the motor drive system and the coolant temperature Te (step S120). The flow rate distribution regulator and the electric pump are then controlled to make a flow rate of the coolant flowed into the engine and a flow rate of the coolant flowed into motors and inverters included in the motor drive system respectively equal to the set engine flow rate demand Vwe and the set motor flow rate demand Vwm (steps S130 and S140).

7 Claims, 3 Drawing Sheets

U.S. PATENT DOCUMENTS

| | | | |
|---|---|---|---|
| 6,435,166 B1 * | 8/2002 | Sato et al. | 123/568.12 |
| 6,668,765 B2 * | 12/2003 | Zlotek | 123/41.31 |
| 6,684,826 B2 * | 2/2004 | Yoshikawa et al. | 123/41.1 |
| 6,705,254 B1 * | 3/2004 | Grabowski et al. | 123/41.29 |
| 7,069,880 B2 * | 7/2006 | Hutchins | 123/41.29 |
| 7,082,905 B2 * | 8/2006 | Fukuda et al. | 123/41.31 |
| 7,343,884 B1 * | 3/2008 | Carney et al. | 123/41.54 |
| 7,377,237 B2 * | 5/2008 | Carney et al. | 123/41.31 |
| 7,644,792 B2 * | 1/2010 | Telakowski | 180/68.1 |
| 7,775,268 B2 * | 8/2010 | Sato et al. | 165/202 |
| 2001/0020452 A1 * | 9/2001 | Suzuki et al. | 123/41.1 |
| 2002/0073726 A1 * | 6/2002 | Hasebe et al. | 62/323.1 |
| 2003/0116104 A1 * | 6/2003 | Zlotek | 123/41.31 |
| 2009/0139472 A1 * | 6/2009 | Gehres et al. | 123/41.08 |
| 2009/0139686 A1 * | 6/2009 | Suzuki | 165/42 |
| 2009/0145375 A1 * | 6/2009 | Kaita et al. | 123/41.02 |
| 2010/0121508 A1 * | 5/2010 | Murata et al. | 701/22 |
| 2011/0132291 A1 * | 6/2011 | Ulrey et al. | 123/41.1 |

FOREIGN PATENT DOCUMENTS

| | | |
|---|---|---|
| JP | A 11-22460 | 1/1999 |
| JP | A 11-107748 | 4/1999 |
| JP | A 2002-227644 | 8/2002 |
| JP | A 2002-276364 | 9/2002 |
| JP | A 2004-218600 | 8/2004 |
| JP | A 2004-332744 | 11/2004 |
| JP | A-2004-346831 | 12/2004 |

* cited by examiner

COOLING SYSTEM, CONTROL METHOD OF COOLING SYSTEM, AND VEHICLE EQUIPPED WITH COOLING SYSTEM

TECHNICAL FIELD

The present invention relates to a cooling system, a control method of the cooling system, and a vehicle equipped with the cooling system.

BACKGROUND ART

One proposed structure of a cooling system includes a circulation flow path arranged to circulate a coolant for cooling down an engine, a branch flow path branched off from the circulation flow path and arranged to flow the coolant into a motor and an inverter, and an electric pump configured to pressure-feed the coolant through the circulation flow path (see, for example, Patent Document 1). In this proposed structure of the cooling system, the electric pump is controlled to increase the flow rate of the coolant with an increase in temperature of the coolant flowed through the engine and with an increase in temperature of the coolant flowed through the motor, for the purpose of adequately cooling down the engine and the motor.
Patent Document 1: Japanese Patent Laid-Open No. 2002-227644

DISCLOSURE OF THE INVENTION

The above prior art cooling system, however, fails to adequately cool down the engine and the motor in some operating conditions of the engine and the motor. For example, in the state of operating the engine with stopping the operation of the motor, the electric pump is controlled to increase the flow rate of the coolant for cooling down the engine. This flow rate control, however, simultaneously increases the flow rate of the coolant flowed into the motor and may cause the motor to be excessively cooled down. In another example, in the state of operating the motor with stopping the operation of the engine, on the other hand, the electric pump is controlled to increase the flow rate of the coolant for cooling down the motor. This flow rate control, however, simultaneously increases the flow rate of the coolant flowed into the engine and may cause the engine to be excessively cooled down. In these operating conditions of the engine and the motor, it is difficult to adequately cool down both the engine and the motor. The increased flow rate of the coolant flowed into either the engine or the motor increases the overall flow rate of the coolant and thus undesirably increases the power consumption of the electric pump.

In the cooling system, the control method of the cooling system, and the vehicle equipped with the cooling system, there would thus be a demand for adequately cooling down a drive train having multiple drive systems respectively including heat-generating drive sources. In the cooling system, the control method of the cooling system, and the vehicle equipped with the cooling system, there would also be a demand for reducing the power consumption of an electric pump configured to pressure-feed a cooling medium to cool down the drive train.

At least part of the above and the other related demands is attained by a cooling system, a control method of the cooling system, and a vehicle equipped with the cooling system having the configurations discussed below.

The present invention is directed to a cooling system provided for a drive train, which has a first drive system including a first heat-generating drive source and a second drive system including a second heat-generating drive source. The cooling system includes: a circulation flow path arranged to flow a cooling medium into the first drive system; a second drive system flow path branched off from the circulation flow path and arranged to bypass the first drive system and thereby flow the cooling medium into the second drive system; a flow rate distribution regulator configured to regulate a distribution ratio of a flow rate of the cooling medium flowed into the first drive system to a flow rate of the cooling medium flowed into the second drive system with bypassing the first drive system; an electric pressure feeder configured to pressure-feed the cooling medium through the circulation flow path; a cooling medium temperature detector configured to measure a temperature of the cooling medium; a first state detector configured to detect a driving state of the first drive system; a second state detector configured to detect a driving state of the second drive system; a flow rate demand setting module configured to set a first flow rate demand required for cooling down the first drive system based on the measured temperature of the cooling medium and the detected driving state of the first drive system and to set a second flow rate demand required for cooling down the second drive system based on the measured temperature of the cooling medium and the detected driving state of the second drive system; and a controller configured to control the flow rate distribution regulator and the electric pressure feeder to make the flow rate of the cooling medium flowed into the first drive system and the flow rate of the cooling medium flowed into the second drive system respectively equal to the set first flow rate demand and the set second flow rate demand.

The cooling system according to one aspect of the invention sets the first flow rate demand required for cooling down the first drive system based on the temperature of the cooling medium and the driving state of the first drive system, while setting the second flow rate demand required for cooling down the second drive system based on the temperature of the cooling medium and the driving state of the second drive system. The flow rate distribution regulator and the electric pressure feeder are then controlled to make the flow rate of the cooling medium flowed into the first drive system and the flow rate of the cooling medium flowed into the second drive system respectively equal to the set first flow rate demand and the set second flow rate demand. The flow of the cooling medium into the first drive system at the first flow rate demand required for cooling down the first drive system and the flow of the cooling medium into the second drive system at the second flow rate demand required for cooling down the second drive system enable both the first drive system and the second drive system to be adequately cooled down. Controlling the electric pressure feeder to make the flow of the cooling medium into the first drive system at the first flow rate demand required for cooling down the first drive system and the flow of the cooling medium into the second drive system at the second flow rate demand required for cooling down the second drive system desirably reduces the power consumption of the electric pressure feeder, compared with the conventional cooling system of pressure feeding the cooling medium into the first drive system and the second drive system at excessively high flow rates exceeding the required flow rates for cooling down.

In one preferable application of the cooling system according to the above aspect of the invention, the first drive system includes an internal combustion engine as the first drive source. The second drive system includes a motor as the second drive source and a driving circuit for driving the motor. The first state detector detects a rotation speed and a torque of the internal combustion engine as the driving state of the first drive system. The second state detector detects a value of electric current flowing through the driving circuit as the driving state of the second drive system. The cooling system of this application enables all the internal combustion engine, the motor, and the driving circuit for the motor to be adequately cooled down.

In one preferable embodiment of the cooling system according to the above aspect of the invention, the cooling medium temperature detector is located in an upstream of the first drive system on the circulation flow path. The cooling system of this embodiment further has: a radiator configured to cool down the cooling medium by heat exchange with outside air; a bypass passage branched off from the circulation flow path and arranged to bypass the radiator and thereby flow the cooling medium from a downstream of the first drive system to an upstream of the cooling medium temperature detector; and a switchover mechanism provided at a junction of the circulation flow path and the bypass passage and configured to switch over a flow passage of the cooling medium to flow the cooling medium through the radiator when a temperature of the cooling medium flowing through the junction is not lower than a preset level and to flow the cooling medium with bypassing the radiator when the temperature of the cooling medium flowing through the junction is lower than the preset level. At the temperature of the cooling medium flowing through the junction of the circulation flow path and the bypass passage that is lower than the preset level, the cooling medium is flowed with bypassing the radiator. Such flow control effectively lowers the cooling efficiency of the cooling medium and thereby prevents the first drive system and the second drive system from being excessively cooled down. At the temperature of the cooling medium flowing through the junction of the circulation flow path and the bypass passage that is equal to or higher than the preset level, on the other hand, the cooling medium is flowed through the radiator. Such flow control accelerates heat radiation of the cooling medium by means of the radiator, so as to lower the flow rates of the cooling medium flowed into the first drive system and into the second drive system and thus desirably reduce the power consumption of the electric pressure feeder.

According to another aspect, the invention pertains to a vehicle equipped with a first drive system including a first heat-generating drive source and with a second drive system including a second heat-generating drive source. The vehicle includes: a circulation flow path arranged to flow a cooling medium into the first drive system; a second drive system flow path branched off from the circulation flow path and arranged to bypass the first drive system and thereby flow the cooling medium into the second drive system; a flow rate distribution regulator configured to regulate a distribution ratio of a flow rate of the cooling medium flowed into the first drive system to a flow rate of the cooling medium flowed into the second drive system with bypassing the first drive system; an electric pressure feeder configured to pressure-feed the cooling medium through the circulation flow path; a cooling medium temperature detector configured to measure a temperature of the cooling medium; a first state detector configured to detect a driving state of the first drive system; a second state detector configured to detect a driving state of the second drive system; a flow rate demand setting module configured to set a first flow rate demand required for cooling down the first drive system based on the measured temperature of the cooling medium and the detected driving state of the first drive system and to set a second flow rate demand required for cooling down the second drive system based on the measured temperature of the cooling medium and the detected driving state of the second drive system; and a controller configured to control the flow rate distribution regulator and the electric pressure feeder to make the flow rate of the cooling medium flowed into the first drive system and the flow rate of the cooling medium flowed into the second drive system respectively equal to the set first flow rate demand and the set second flow rate demand.

The vehicle according to this aspect of the invention is equipped with the cooling system having any of the above configurations and accordingly has the similar effects and advantages to those of the cooling system according to the invention described above. Namely the vehicle of this aspect enables both the first drive system and the second drive system to be adequately cooled down and desirably reduces the power consumption of the electric pressure feeder.

The present invention is also directed to a control method of a cooling system. The cooling system has: a circulation flow path arranged to flow a cooling medium into a first drive system including a first heat-generating drive source; a second drive system flow path branched off from the circulation flow path and arranged to bypass the first drive system and thereby flow the cooling medium into a second drive system including a second heat-generating drive source; a flow rate distribution regulator configured to regulate a distribution ratio of a flow rate of the cooling medium flowed into the first drive system to a flow rate of the cooling medium flowed into the second drive system with bypassing the first drive system; and an electric pressure feeder configured to pressure-feed the cooling medium through the circulation flow path. The control method includes: setting a first flow rate demand required for cooling down the first drive system based on a temperature of the cooling medium and a driving state of the first drive system, while setting a second flow rate demand required for cooling down the second drive system based on the temperature of the cooling medium and a driving state of the second drive system; and controlling the flow rate distribution regulator and the electric pressure feeder to make the flow rate of the cooling medium flowed into the first drive system and the flow rate of the cooling medium flowed into the second drive system respectively equal to the set first flow rate demand and the set second flow rate demand.

The control method of the cooling system according to another aspect of the invention sets the first flow rate demand required for cooling down the first drive system based on the temperature of the cooling medium and the driving state of the first drive system, while setting the second flow rate demand required for cooling down the second drive system based on the temperature of the cooling medium and the driving state of the second drive system. The flow rate distribution regulator and the electric pressure feeder are then controlled to make the flow rate of the cooling medium flowed into the first drive system and the flow rate of the cooling medium flowed into the second drive system respectively equal to the set first flow rate demand and the set second flow rate demand. The flow of the cooling medium into the first drive system at the first flow rate demand required for cooling down the first drive system and the flow of the cooling medium into the second drive system at the second flow rate demand required for cooling down the second drive system enable both the first drive system and the second drive system to be adequately cooled down. Controlling the electric pressure feeder to make the flow of the cooling medium into the first drive system at the first flow rate demand required for cooling down the first drive system and the flow of the cooling medium into the second drive system at the second flow rate demand required for cooling down the second drive system desirably reduces the power consumption of the electric pressure feeder, compared with the conventional cooling system of pressure feeding the cooling medium into the first drive system and the second drive system at excessively high flow rates exceeding the required flow rates for cooling down.

BEST MODES OF CARRYING OUT THE INVENTION

Figure 1:
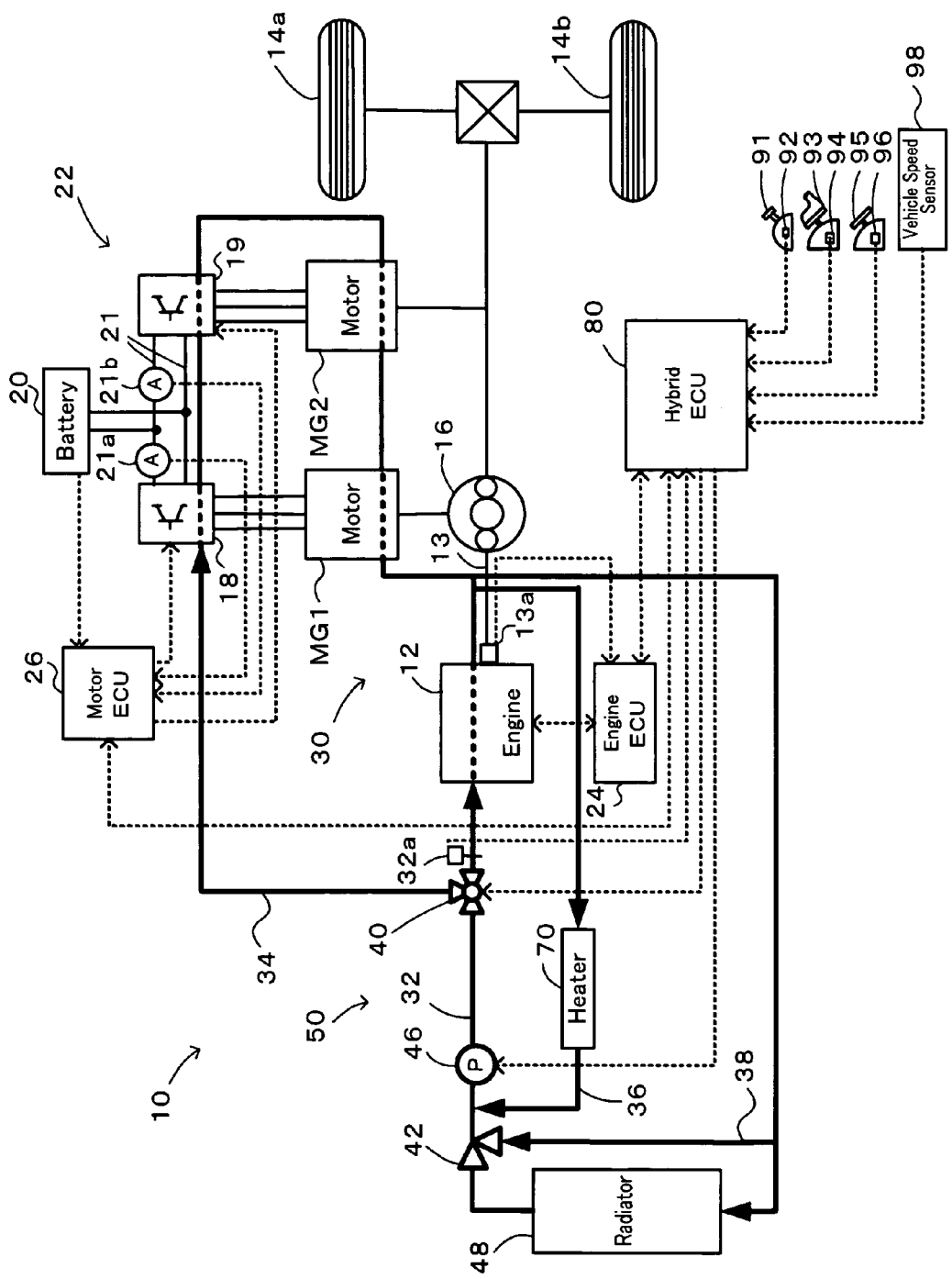
FIG. 1 schematically illustrates the configuration of a hybrid vehicle 10 in one embodiment according to the invention.

One mode of carrying out the invention is described below as a preferred embodiment with reference to the accompanied drawings. FIG. 1 schematically illustrates the configuration of a hybrid vehicle 10 equipped with a cooling system 50 in one embodiment according to the invention. The hybrid vehicle 10 of the embodiment is equipped with a drive train 30 and a hybrid electronic control unit (hereafter referred to as hybrid ECU) 80 configured to control the operations of the whole hybrid vehicle 10, as well as the cooling system 50. The drive train 30 includes an engine 12, a planetary gear mechanism 16 designed to have a carrier connected to a crankshaft 13 of the engine 12 and a ring gear connected to a driveshaft linked with an axle of front wheels 14a and 14b, a motor MG1 configured to have a rotating shaft connected to a sun gear of the planetary gear mechanism 16 and to have power generation capability, a motor MG2 configured to have a rotating shaft connected to the ring gear of the planetary gear mechanism 16, and a battery 20 designed to transmit electric power to and from the motors MG1 and MG2 via inverters 18 and 19. The cooling system 50 works to cool down the engine 12 and a motor drive system 22, which includes the motors MG1 and MG2 and the inverters 18 and 19. The hybrid vehicle 10 also has a heater 70 designed to supply the hot air to a passenger compartment (not shown). The operations of the engine 12 are controlled by an engine electronic control unit (hereafter referred to as engine ECU) 24. The operations of the motors MG1 and MG2 are controlled through switching control of switching elements included in the inverters 18 and 19 as a driving circuit by a motor electronic control unit (hereafter referred to as motor ECU) 26. The battery 20 is also under management and control of the motor ECU 26.

The cooling system 50 includes a circulation flow path 32 arranged to flow a coolant into the engine 12, an electric pump 46 designed to pressure-feed and circulate the coolant through the circulation flow path 32, and a radiator 48 constructed as a heat exchanger to cool down the coolant by heat exchange with the outside air. A motor drive system flow path 34, a heater flow path 36, and a bypass passage 38 are branched off from the circulation flow path 32. The motor drive system flow path 34 is arranged to introduce the coolant from the upstream of the engine 12 into the motor drive system 22. The heater flow path 36 is arranged to introduce part of the coolant from the downstream of the engine 12 into the heater 70 and to make the part of the coolant flow back to the upstream of the engine 12. The bypass passage 38 is arranged to bypass the radiator 48 and thereby flow the coolant from the downstream of the engine 12 to the upstream of the engine 12.

A flow rate distribution regulator 40 is provided at a junction of the circulation flow path 32 and the motor drive system flow path 34. The flow rate distribution regulator 40 has a rotary valve mechanism rotated by a driving motor (not shown) under operation control of the hybrid ECU 80. The flow rate distribution regulator 40 controls a valve opening to the circulation flow path 32 and a valve opening to the motor drive system flow path 34, in order to regulate a distribution ratio of a flow rate of the coolant flowed into the engine 12 to a flow rate of the coolant flowed into the motor drive system 22 with bypassing the engine 12. For example, the flow rate distribution regulator 40 may set the valve opening to the circulation flow path 32 at its full closed position and the valve opening to the motor drive system flow path 34 at its full open position, so as to flow the coolant into the motor drive system 22 with bypassing the engine 12. In another example, the flow rate distribution regulator 40 may set the valve opening to the motor drive system flow path 34 at its full closed position and the valve opening to the circulation flow path 32 at its full open position, so as to flow the coolant into the engine 12 without making the flow of the coolant into the motor drive system flow path 34. In still another example, the flow rate distribution regulator 40 may adequately regulate the valve opening to the circulation flow path 32 and the valve opening to the motor drive system flow path 34 to enable the coolant to be flowed both into the engine 12 and into the motor drive system 22. The flow rate distribution regulator 40 is designed to increase the flow rate of the coolant flowed into the motor drive system 22 and decrease the flow rate of the coolant flowed into the engine 12 with an increase in valve opening to the motor drive system flow path 34.

A thermostat valve 42 is provided at a junction of the circulation flow path 32 and the bypass passage 38. At the temperature of the circulated coolant of or over a preset temperature level, the thermostat valve 42 fully closes the bypass passage 38 and fully opens a passage from the radiator 48 to flow the coolant through the radiator 48. At the temperature of the circulated coolant below the preset temperature level, on the other hand, the thermostat valve 42 fully closes the passage from the radiator 48 and fully opens the bypass passage 38 to switch over the flow passage of the coolant and make the flow of the coolant with bypassing the radiator 48.

The electric pump 46 is driven by a driving motor (not shown) under operation control of the hybrid ECU 80. The electric pump 46 pressure-feeds a specific flow rate of the coolant to the circulation flow path 32 corresponding to a duty ratio or a ratio of an on-time to an off-time of the driving motor.

The hybrid ECU 80 is constructed as a microprocessor including a CPU, a ROM configured to store processing programs, a RAM configured to temporarily store data, input-output ports, and a communication port, although the respective constituents are not specifically illustrated. The hybrid ECU 80 receives, via its input port, a coolant temperature Tw from a coolant temperature sensor 32a provided in the vicinity of the inlet of the engine 12 on the circulation flow path 32, a gearshift position SP or a current setting position of a gearshift lever 91 from a gearshift position sensor 92, an accelerator opening Acc or the driver's depression amount of an accelerator pedal 93 from an accelerator pedal position sensor 94, a brake pedal position BP or the driver's depression amount of a brake pedal 95 from a brake pedal position sensor 96, and a vehicle speed V from a vehicle speed sensor 98. The hybrid ECU 80 is connected with the engine ECU 24 and with the motor ECU 26 via its communication port to transmit variety of control signals and data to and from the engine ECU 24 and the motor ECU 26.

The hybrid vehicle 10 of the embodiment thus constructed calculates a torque demand to be output to the drive shaft, based on observed values of a vehicle speed V and an accelerator opening Acc, which corresponds to a driver's step-on amount of an accelerator pedal 93. The engine 12 and the motors MG1 and MG2 are subjected to operation control to output a required level of power corresponding to the calculated torque demand to the drive shaft. The operation control of the engine 12 and the motors MG1 and MG2 selectively effectuates one of a torque conversion drive mode, a charge-discharge drive mode, and a motor drive mode. The torque conversion drive mode controls the operations of the engine 12 to output a quantity of power equivalent to the required level of power, while driving and controlling the motors MG1 and MG2 to cause all the power output from the engine 12 to be subjected to torque conversion by means of the planetary gear mechanism 16 and the motors MG1 and MG2 and output to the drive shaft. The charge-discharge drive mode controls the operations of the engine 12 to output a quantity of power equivalent to the sum of the required level of power and a quantity of electric power consumed by charging the battery 20 or supplied by discharging the battery 20, while driving and controlling the motors MG1 and MG2 to cause all or part of the power output from the engine 12 equivalent to the required level of power to be subjected to torque conversion by means of the planetary gear mechanism 16 and the motors MG1 and MG2 and output to the drive shaft, simultaneously with charge or discharge of the battery 20. The motor drive mode stops the operations of the engine 12 and drives and controls the motor MG2 to output a quantity of power equivalent to the required level of power to the drive shaft.

Figure 2:
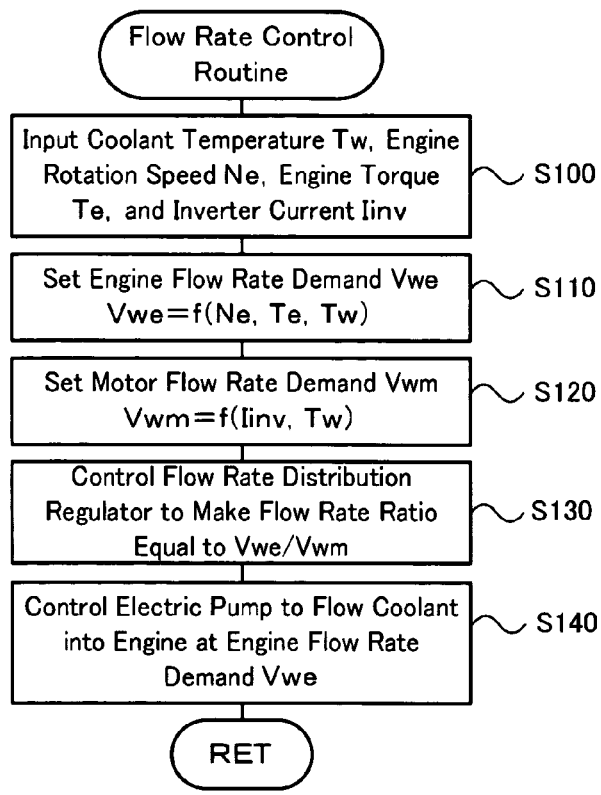
FIG. 2 is a flowchart showing a flow rate control routine executed by a hybrid ECU 80.

The description regards the operations of the cooling system 50 mounted on the hybrid vehicle 10 of the embodiment having the configuration described above, especially a series of processing to control the flow rate of the coolant flowed into the engine 12 and the flow rate of the coolant flowed into the motor drive system 22. FIG. 2 is a flowchart showing a flow rate control routine executed by the hybrid ECU 80. This flow rate control routine is performed repeatedly at preset time intervals, for example, at every several msec.

In the flow rate control routine, the CPU (not shown) of the hybrid ECU 80 first inputs various data required for control, for example, the coolant temperature Tw from the coolant temperature sensor 32a, a rotation speed Ne of the engine 12, an output torque Te of the engine 12, and an inverter current Iinv flowing through the inverters 18 and 19 (step S100). The rotation speed Ne of the engine 12 is computed from an output signal of a crank position sensor 13a attached to the crankshaft 13 and is input from the engine ECU 24 by communication. The torque Te of the engine 12 is computed from a loading torque of the motor MG1, which depends upon a driving current of the motor MG1, and a gear ratio ρ of the planetary gear mechanism 16 and is input from the engine ECU 24 by communication. The inverter current Iinv is set to the greater between a direct current value of the inverter 18 measured by a current sensor 21a attached to a power line 21 and a direct current value of the inverter 19 measured by a current sensor 21b attached to the power line 21 and is input from the motor ECU 26 by communication.

Figure 3:
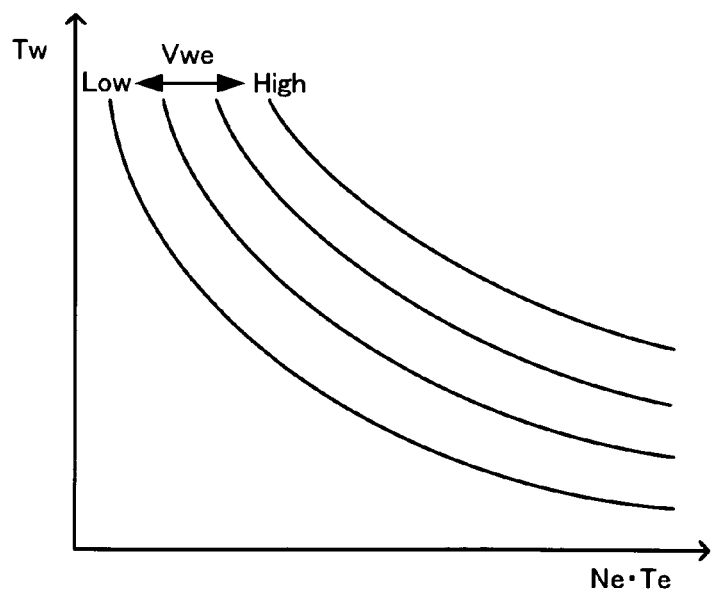
FIG. 3 shows one example of an engine flow rate demand setting map.

After the data input, the CPU sets an engine flow rate demand Vwe as a flow rate of the coolant required for cooling down the engine 12, based on the input rotation speed Ne and the input torque Te of the engine 12 and the input coolant temperature Tw (step S110). A concrete procedure of setting the engine flow rate demand Vwe in this embodiment specifies and stores in advance variations in coolant temperature Tw against the product of the rotation speed Ne and the torque Te of the engine 12 with regard to various values of the engine flow rate demand Vwe as an engine flow rate demand setting map in the ROM (not shown) of the hybrid ECU 80 and reads the engine flow rate demand Vwe corresponding to the combination of the given coolant temperature Tw and the product of the given rotation speed Ne and the given torque Te of the engine 12 from the engine flow rate demand setting map. One example of the engine flow rate demand setting map is shown in FIG. 3. The engine flow rate demand setting map is designed to increase the engine flow rate demand Vwe with an increase in product of the rotation speed Ne and the torque Te of the engine 12 and with an increase in coolant temperature Tw.

Figure 4:
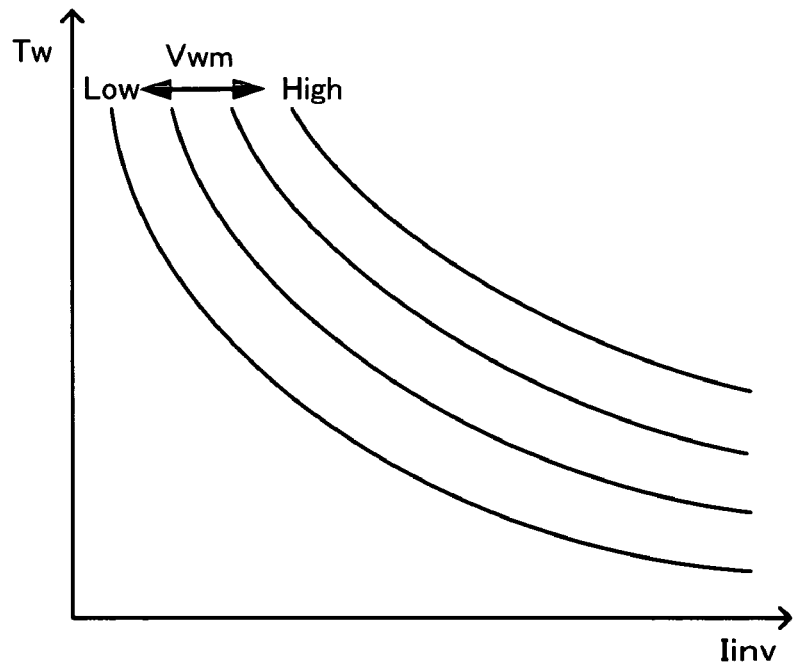
FIG. 4 shows one example of a motor flow rate demand setting map.

The CPU subsequently sets a motor flow rate demand Vwm as a flow rate of the coolant required for cooling down the motor drive system 22, based on the input inverter current Iinv and the input coolant temperature Tw (step S120). A concrete procedure of setting the motor flow rate demand Vwm in this embodiment specifies and stores in advance variations in coolant temperature Tw against the inverter current Iinv with regard to various values of the motor flow rate demand Vwm as a motor flow rate demand setting map in the ROM (not shown) of the hybrid ECU 80 and reads the motor flow rate demand Vwm corresponding to the combination of the given coolant temperature Tw and the given inverter current Iinv from the motor flow rate demand setting map. One example of the motor flow rate demand setting map is shown in FIG. 4. The motor flow rate demand setting map is designed to increase the motor flow rate demand Vwm with an increase in inverter current Iinv and with an increase in coolant temperature Tw.

After setting the engine flow rate demand Vwe and the motor flow rate demand Vwm, the CPU sets a valve opening A of the valve mechanism (not shown) of the flow rate distribution regulator 40 and controls the valve mechanism (not shown) to have the set valve opening (step S130). The valve opening A is set to make the ratio of the flow rate of the coolant flowed into the engine 12 to the flow rate of the coolant flowed into the motor drive system 22 equal to a ratio Vr of the set engine flow rate demand Vwe to the set motor flow rate demand Vwm.

Figure 5:
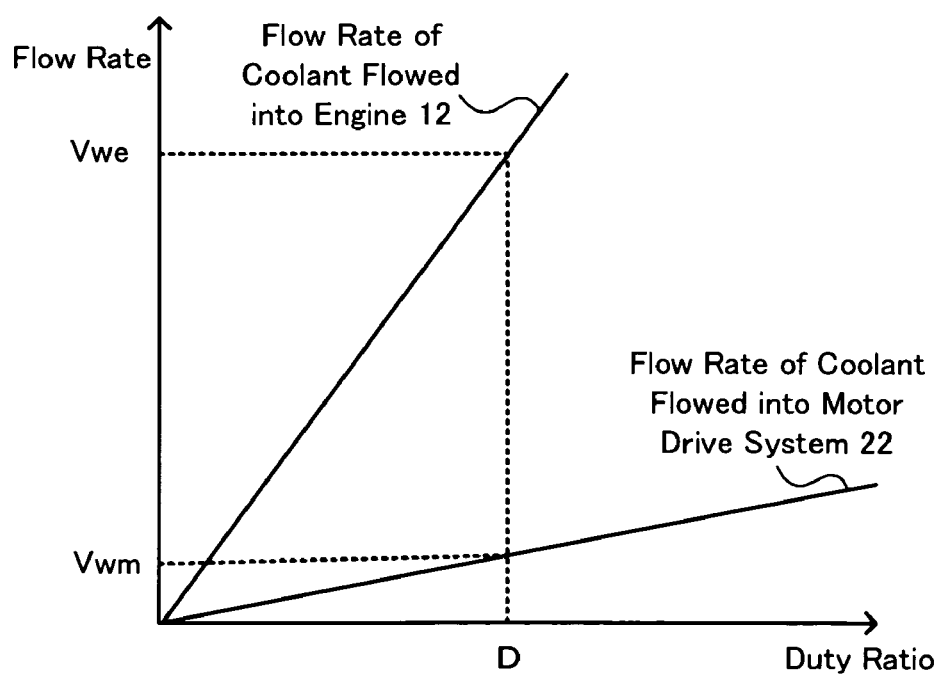
FIG. 5 shows a duty ratio setting map at a specific valve opening and its relation to a variation in flow rate of a coolant flowed into a motor drive system 22.

The CPU subsequently sets the duty ratio of the driving motor (not shown) for the electric pump 46 and controls the driving motor for the electric pump 46 to be driven at the set duty ratio and thereby flow the coolant into the engine 12 at the set engine flow rate demand Vwe (step S140). The flow rate control routine is then terminated. A concrete procedure of setting the duty ratio of the driving motor for the electric pump 46 specifies and stores in advance a variation in duty ratio of the driving motor for the electric pump 46 against the valve opening A and the flow rate of the coolant flowed into the engine 12 at the valve opening A as a duty ratio setting map in the ROM (not shown) of the hybrid ECU 80 and reads the duty ratio of the driving motor for the electric pump 46 corresponding to the given valve opening A and the given engine flow rate demand Vwe from the duty ratio setting map. FIG. 5 shows a duty ratio setting map at a specific valve opening and its relation to a variation in flow rate of the coolant flowed into the motor drive system 22. As shown in FIG. 5, the flow rate distribution regulator 40 is driven to make the ratio of the flow rate of the coolant flowed into the engine 12 to the flow rate of the coolant flowed into the motor drive system 22 equal to the ratio Vr of the set engine flow rate demand Vwe to the set motor flow rate demand Vwm. Setting the duty ratio to a value D to flow the coolant into the engine 12 at the engine flow rate demand Vwe automatically regulates the flow rate of the coolant flowed into the motor drive system 22 to the motor flow rate demand Vwm. Namely the electric pump 46 with the duty ratio of the driving motor set to the value D pressure-feeds the coolant at an overall flow rate as the sum of the engine flow rate demand Vwe and the motor flow rate demand Vwm. The flow of the coolant into the engine 12 at the engine flow rate demand Vwe and the flow of the coolant into the motor drive system 22 at the motor flow rate demand Vwm enable both the engine 12 and the motor drive system 22 to be not excessively but to be adequately cooled down.

The electric pump 46 pressure-feeds the coolant at the specific flow rates required for cooling down the engine 12 and the motor drive system 22. Such flow rate control desirably reduces the power consumption of the electric pump 46, compared with the conventional cooling system of feeding the coolant into the engine 12 and into the motor drive system 22 at excessively high flow rates exceeding the required flow rates for cooling down.

At the temperature of the circulated coolant below the preset temperature level, the thermostat valve 42 switches over the flow passage of the coolant to flow the coolant with bypassing the radiator 48. Such flow control prevents the engine 12 and the motor drive system 22 from being excessively cooled down. At the temperature of the circulated coolant of or above the preset temperature level, on the other hand, the thermostat valve 42 switches over the flow passage of the coolant to flow the coolant through the radiator 48. Such flow control accelerates heat radiation of the coolant, so as to lower the flow rate of the coolant pressure-fed by the electric pump 46 and thus desirably reduce the power consumption of the electric pump 46.

As described above, the hybrid vehicle 10 of the embodiment controls the flow rate distribution regulator 40 and the electric pump 46 to make the flow rate of the coolant flowed into the engine 12 and the flow rate of the coolant flowed into the motor drive system 22 respectively equal to the set engine flow rate demand Vwe and the set motor flow rate demand Vwm. Such flow rate control enables both the engine 12 and the motor drive system 22 to be adequately cooled down. The flow rate control of the embodiment also effectively reduces the power consumption of the electric pump 46, compared with the conventional cooling system of feeding the coolant into the engine 12 and into the motor drive system 22 at excessively high flow rates exceeding the required flow rates for cooling down.

The hybrid vehicle 10 of the embodiment sets the engine flow rate demand Vwe based on the detected rotation speed Ne and the detected torque Te of the engine 12 and the measured coolant temperature Tw. This is, however, not restrictive, but the setting of the engine flow rate demand Vwe may be based on any other factors representing the operating conditions of the engine 12. One modified procedure may set the engine flow rate demand Vwe based on the coolant temperature Tw input from the coolant temperature sensor 32a as well as a temperature of the coolant measured immediately after transmission of the coolant through the engine 12.

The hybrid vehicle 10 of the embodiment sets the motor flow rate demand Vwm based on the detected inverter current Iinv and the measured coolant temperature Tw. This is, however, not restrictive, but the setting of the motor flow rate demand Vwm may be based on any other factors representing the driving conditions of the motor drive system 22. One modified procedure may set the motor flow rate demand Vwm based on the coolant temperature Tw input from the coolant temperature sensor 32a as well as a temperature of the coolant measured immediately after transmission of the coolant through the motor MG1.

In the hybrid vehicle 10 of the embodiment, the coolant temperature sensor 32a is located in the vicinity of the inlet of the engine 12. This location is, however, not essential, but the coolant temperature sensor 32a may be located at any suitable position to measure the temperature of the coolant flowed into the engine 12 and into the motor drive system 22, for example, between the radiator 48 and the flow rate distribution regulator 40 or between the flow rate distribution regulator 40 and the inverter 18.

In the hybrid vehicle 10 of the embodiment, the circulation flow path 32 is equipped with the thermostat valve 42, the bypass passage 38 arranged to flow the coolant with bypassing the radiator 48, and the heater flow path 36 arranged to flow the coolant into the heater 70. Any of the bypass passage 38, the thermostat valve 42, and the heater flow path 36 may be omitted from the cooling system 50 when not required.

In the hybrid vehicle 10 of the embodiment, the motor drive system flow path 34 is arranged to flow the coolant into the motors MG1 and MG2 and the inverters 18 and 19. This arrangement is, however, not essential, but the motor drive system flow path may be arranged to flow the coolant into at least one of the motors MG1 and MG2 and the inverters 18 and 19, for example, to flow the coolant only into the motor MG1 or to flow the coolant only into the inverter 18.

The embodiment regards the cooling system configured to cool down the drive train including the engine, the two motors, and the driving circuits for driving the respective motors. The principle of the invention is applicable to any drive train including two different heat-generating drive sources, for example, to a drive train including an engine, one motor, and a driving circuit for driving the motor.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

INDUSTRIAL APPLICABILITY

The technique of the invention is preferably applicable to the manufacturing industries of cooling systems and vehicles.

The invention claimed is:

1. A cooling system provided for a drive train, which has a first drive system including a first heat-generating drive source and a second drive system including a second heat-generating drive source, the cooling system comprising:
    a circulation flow path arranged to flow a cooling medium into the first drive system;
    a second drive system flow path branched off from the circulation flow path and arranged to bypass the first drive system and thereby flow the cooling medium into the second drive system;
    a flow rate distribution regulator configured to regulate a distribution ratio of a flow rate of the cooling medium flowed into the first drive system to a flow rate of the cooling medium flowed into the second drive system with bypassing the first drive system;
    an electric pressure feeder configured to pressure-feed the cooling medium through the circulation flow path;

a cooling medium temperature detector configured to measure a temperature of the cooling medium;

a first state detector configured to detect a driving state of the first drive system;

a second state detector configured to detect a driving state of the second drive system;

a flow rate demand setting module configured to set a first flow rate demand required for cooling down the first drive system based on the measured temperature of the cooling medium and the detected driving state of the first drive system and to set a second flow rate demand required for cooling down the second drive system based on the measured temperature of the cooling medium and the detected driving state of the second drive system; and a controller configured to control the flow rate distribution regulator and the electric pressure feeder to make the flow rate of the cooling medium flowed into the first drive system and the flow rate of the cooling medium flowed into the second drive system respectively equal to the set first flow rate demand and the set second flow rate demand.

2. The cooling system in accordance with claim 1, wherein the first drive system includes an internal combustion engine as the first drive source, the second drive system includes a motor as the second drive source and a driving circuit for driving the motor, the first state detector detects a rotation speed and a torque of the internal combustion engine as the driving state of the first drive system, and the second state detector detects a value of electric current flowing through the driving circuit as the driving state of the second drive system.

3. The cooling system in accordance with claim 1, wherein the cooling medium temperature detector is located in an upstream of the first drive system on the circulation flow path, the cooling system further including:

a radiator configured to cool down the cooling medium by heat exchange with outside air;

a bypass passage branched off from the circulation flow path and arranged to bypass the radiator and thereby flow the cooling medium from a downstream of the first drive system to an upstream of the cooling medium temperature detector; and a switchover mechanism provided at a junction of the circulation flow path and the bypass passage and configured to switch over a flow passage of the cooling medium to flow the cooling medium through the radiator when a temperature of the cooling medium flowing through the junction is not lower than a preset level and to flow the cooling medium with bypassing the radiator when the temperature of the cooling medium flowing through the junction is lower than the preset level.

4. A vehicle equipped with a first drive system including a first heat-generating drive source and with a second drive system including a second heat-generating drive source, the vehicle comprising:

a circulation flow path arranged to flow a cooling medium into the first drive system;

a second drive system flow path branched off from the circulation flow path and arranged to bypass the first drive system and thereby flow the cooling medium into the second drive system;

a flow rate distribution regulator configured to regulate a distribution ratio of a flow rate of the cooling medium flowed into the first drive system to a flow rate of the cooling medium flowed into the second drive system with bypassing the first drive system;

an electric pressure feeder configured to pressure-feed the cooling medium through the circulation flow path;

a cooling medium temperature detector configured to measure a temperature of the cooling medium;

a first state detector configured to detect a driving state of the first drive system;

a second state detector configured to detect a driving state of the second drive system;

a flow rate demand setting module configured to set a first flow rate demand required for cooling down the first drive system based on the measured temperature of the cooling medium and the detected driving state of the first drive system and to set a second flow rate demand required for cooling down the second drive system based on the measured temperature of the cooling medium and the detected driving state of the second drive system; and a controller configured to control the flow rate distribution regulator and the electric pressure feeder to make the flow rate of the cooling medium flowed into the first drive system and the flow rate of the cooling medium flowed into the second drive system respectively equal to the set first flow rate demand and the set second flow rate demand.

5. The vehicle in accordance with claim 4, wherein the first drive system includes an internal combustion engine as the first drive source, the second drive system includes a motor as the second drive source and a driving circuit for driving the motor, the first state detector detects a rotation speed and a torque of the internal combustion engine as the driving state of the first drive system, and the second state detector detects a value of electric current flowing through the driving circuit as the driving state of the second drive system.

6. The vehicle in accordance with claim 4, wherein the cooling medium temperature detector is located in an upstream of the first drive system on the circulation flow path, the cooling system further including:

a radiator configured to cool down the cooling medium by heat exchange with outside air;

a bypass passage branched off from the circulation flow path and arranged to bypass the radiator and thereby flow the cooling medium from a downstream of the first drive system to an upstream of the cooling medium temperature detector; and a switchover mechanism provided at a junction of the circulation flow path and the bypass passage and configured to switch over a flow passage of the cooling medium to flow the cooling medium through the radiator when a temperature of the cooling medium flowing through the junction is not lower than a preset level and to flow the cooling medium with bypassing the radiator when the temperature of the cooling medium flowing through the junction is lower than the preset level.

7. A control method of a cooling system, the cooling system having: a circulation flow path arranged to flow a cooling medium into a first drive system including a first heat-generating drive source; a second drive system flow path branched off from the circulation flow path and arranged to bypass the first drive system and thereby flow the cooling medium into a second drive system including a second heat-generating drive source; a flow rate distribution regulator configured to regulate a distribution ratio of a flow rate of the cooling medium flowed into the first drive system to a flow rate of the cooling medium flowed into the second drive system with bypassing the first drive system; and an electric pressure feeder configured to pressure-feed the cooling medium through the circulation flow path, the control method comprising:

setting a first flow rate demand required for cooling down the first drive system based on a temperature of the cooling medium and a driving state of the first drive system, while setting a second flow rate demand required for cooling down the second drive system based on the temperature of the cooling medium and a driving state of the second drive system; and controlling the flow rate distribution regulator and the electric pressure feeder to make the flow rate of the cooling medium flowed into the first drive system and the flow rate of the cooling medium flowed into the second drive system respectively equal to the set first flow rate demand and the set second flow rate demand.

* * * * *